Patented Apr. 13, 1937

2,076,714

UNITED STATES PATENT OFFICE 2,076,714

DERIVATIVES OF 1-PHENYL-2.3-DIMETHYL-4-AMINO-5-PYRAZOLONE

Louis Freedman, Albany, N. Y., assignor to Winthrop Chemical Company, Inc., New York, N. Y., a corporation of New York No Drawing. Application May 31, 1935, Serial No. 24,363

9 Claims. (Cl. 260—28)

This invention relates to new derivatives of 1-phenyl-2.3-dimethyl-4-amino-5-pyrazolone, and to methods of preparing the same.

An object of this invention is to prepare derivatives of said pyrazolone in which the hydrogen atoms of the amino group are replaced by alkylol or aralkylol groups, or the anhydrides thereof, in the form of a morpholin ring compound. These compounds are designated by the general formulae:

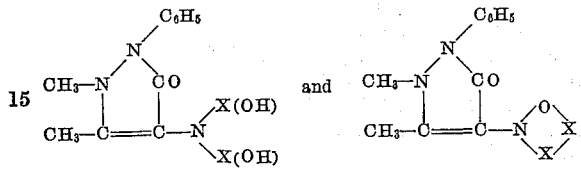

wherein X, which may be alike or different, represents alkylene or aralkylene groups.

More specifically this invention contemplates, as a further object the diethanol and diethyl ether derivatives of 1-phenyl-2.3-dimethyl-4-amino-5-pyrazolone and methods of preparing them.

Phenyl dimethyl pyrazolone and its derivatives, especially the 4-dimethyl amino derivative, are known to have strong antipyretic and analgesic properties. My new alkylol, aralkylol and morpholin derivatives are deemed to have even more advantageous properties, such as, higher therapeutic efficiency and lowered toxicity, than the present known derivatives of phenyl dimethyl amino pyrazolone.

I have found that 1-phenyl-2.3-dimethyl-4-amino-5-pyrazolone will react with alkylene and aralkylene oxides or the corresponding halohydrins, i. e. chloro- and bromohydrins in aqueous solution to form the alkylol and aralkylol derivatives in practically quantitative yield. Suitable alkylene oxides are ethylene oxide, propylene oxide, butylene oxide and the like. As aralkylene oxides I may employ phenyl ethylene oxide, $\alpha$-$\beta$-diphenyl ethylene oxide and the like. The same products are produced by replacing the oxides by the corresponding halohydrins, preferably the chloro- and bromo hydrins.

The 1-phenyl-2.3-dimethyl-4-alkylol- and aralkylol amino-5-pyrazolones are convertible into the corresponding morpholin derivatives by heating in the presence of a condensing agent. Acid condensing agents of the type of sulfuric and hydrochloric acids may be used to promote the conversion. I have found it more convenient, however, to effect the condensation with a halogenated dialkyl ether, such as dichlor-diethyl ether, in the presence of a weak alkaline reagent, which is comparatively soluble in water. A suitable alkali is sodium carbonate. The reaction is generally inaugurated by heating under a reflux to the neighborhood of 100–110° C. This method permits formation of the morpholin derivatives in yields as high as 60 to 65% of the theoretical.

The morpholins may also be prepared by starting from agents other than said alkylol or aralkylol derivatives. Thus I am also able to form the morpholins by reacting the halogen derivatives of phenyl dimethyl pyrazolone such as 4-chlor or 4-brom with amino-diethyl ether.

The following examples, in which parts are given by weight, serve to illustrate my invention. It is to be understood, however, that these examples are not to be considered as restrictive of my invention.

Example 1

100 grams of 1-phenyl-2.3-dimethyl-4-amino-5-pyrazolone are dissolved in 300 grams of water and the solution cooled to 10° C. Ethylene oxide gas is then passed into the solution, while keeping the temperature at 10 to 15° C., and agitating the mixture by means of a stirrer, until a total of 50 grams of ethylene oxide have been absorbed. This constitutes approximately 20% excess ethylene oxide over the theoretical amount required. Without further cooling, the stirring is continued, the mixture gradually warming of itself until a maximum temperature of about 45° C. is reached in approximately 1 hour. The stirring is continued for about 2 hours longer, the temperature of the reaction mixture gradually dropping to room temperature. An orange-red colored solution is obtained. The water is distilled off on a steam or hot water bath under reduced pressure until a thick syrupy residue is produced. On standing, this syrupy residue gradually crystallizes in the form of clusters or rosettes of needle-like prisms until the entire mass becomes solid. The yield of this product is 140 grams equivalent to 97% of the theoretical yield. The product is typified by the following formula:

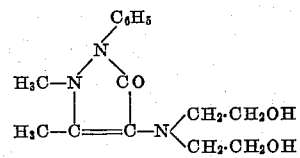

This product, although crystalline, is not pure, the melting point being below 50° C. It probably still retains traces of water. It is very soluble in water, alcohol, chloroform, and ethylene dichloride. It is only slightly soluble in benzol, carbon tetrachloride and ether. It can be recrystallized from a mixture of 10 parts by volume of carbon tetrachloride and 2 parts by volume of ethylene dichloride. It is obtained in the form of thin, colorless or light yellow crystalline prisms, melting at 85 to 87° C. (uncorrected).

It forms a hydrochloride in the form of colorless rectangular prisms, melting at 162 to 164° C. The hydrochloride is prepared by dissolving the base in 1½ parts by volume of 99% alcohol, adding the calculated amount of hydrochloric acid in the form of alcoholic HCl and allowing the solution to stand in the cold for several hours. The crystallization is initiated by seeding. The aqueous solutions of both the base and the hydrochloride give a deep blue color with ferric chloride test reagent.

Analysis of the above diethanol-4-amino base gave the following result:

Nitrogen found—14.22%; calculated for $C_{15}H_{21}N_3O_3$—14.42%. Analysis of the hydrochloride gave the following result:

By titration with AgNO₃—found 11.40% HCl.
By titration with NaOH—found 10.94% HCl.
Calculated for $C_{15}H_{21}N_3O_3.HCl$—11.14% HCl.

By using propylene or butylene oxide or phenyl ethylene oxide or the like in lieu of ethylene oxide the corresponding 4-dipropanol-, 4-dibutanol- and the like amino derivatives of phenyl dimethyl pyrazolone are obtained. These products may be purified in the same manner as the ethanol derivative.

*Example 2*

50 parts of crude 1-phenyl-2.3-dimethyl-4-diethanol-amino-5-pyrazolone are heated with 600 parts of 70% sulfuric acid at 130–140° C. for 6–9 hours. The acid mixture is neutralized with soda ash whereby a dark semi-tarry residue is obtained. This residue is extracted with benzol. The residue obtained from the benzol extract is purified by dissolving it in dilute hydrochloric acid solution, warming with iron-free charcoal and after filtering off the charcoal, neutralizing the solution with dilute sodium hydroxide solution. The morpholin compound crystallizes from this neutral solution almost immediately in the form of thin white needles. It can be recrystallized from hot benzol in which it is soluble to the extent of about 1 part in 4 parts by volume. At room temperature it is very soluble in alcohol, moderately soluble in benzol, chloroform and ether and difficultly soluble in cold water. It is readily soluble in hot water from which it crystallizes out very slowly on cooling.

The product is represented by the following formula:

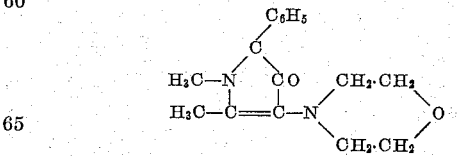

After several recrystallizations, the pure morpholin compound melted at 157.5 to 158.5° C. (corrected). It may be converted to a crystalline hydrochloride by treating the base dissolved in alcohol with the required amount of alcoholic hydrochloric acid. The hydrochloride forms colorless prismatic crystals and melts at 187 to 189° C.

Analysis of the morpholin base gave the following results: Nitrogen found—15.34% calculated for $C_{15}H_{19}N_3O_2$—15.38%.

Analysis of the hydrochloride gave:
By titration with AgNO₃—11.78% HCl.
By titration with NaOH—11.67% HCl.
Calculated for $C_{15}H_{19}N_3O_2.HCl$—11.79% HCl.

Aqueous solutions of both the base and the hydrochloride give a deep greenish-blue color with ferric chloride test reagent.

*Example 3*

40.6 grams of 1-phenyl-2.3-dimethyl-4-amino-5-pyrazolone suspended in 60 cc. water, are treated with 45 grams ββ′ dichlor diethyl ether and 25 grams of sodium carbonate monohydrate. The mixture is heated in an oil bath, with stirring and refluxing, at 108 to 110° C. for 8 hours. On cooling, the dark oily part of the reaction mixture solidifies to a brownish mass of needle-like crystals. The mass of crystals is broken up and filtered, washed with water to remove inorganic salts and finally washed with a small amount of ether to remove the excess of dichlor diethyl ether.

The crude morpholin compound is purified by dissolving it in 10 parts of water containing a slight excess of hydrochloric acid over the calculated amount necessary to form the hydrochloride of the base. The solution is decolorized by warming with iron-free charcoal. The solution is filtered, and on addition of sufficient 5% NaOH solution to bring the solution to a point just short of neutral, leaving the solution acid to litmus paper, the base is recovered as thin, greyish or yellow-white, needles. The mixture is cooled, filtered and washed with a small amount of cold water and dried at 50° C. The yield is about 35 grams equal to 65% of theory.

The product melts at 156 to 157° C. This product may be further purified by recrystallization from benzol. The yield of purified product, in the form of colorless, fluffy needle-like crystals is 31 to 32 grams. It melts at 157.5 to 158.5° C. By making a mixed melting point with the morpholin derivative obtained from the diethanol amino compound previously described, the two compounds were found to be identical.

It is to be borne in mind that I do not wish to be restricted in the scope of the patent granted on my invention except as necessitated by prior art and the appended claims.

What I claim is:

1. The method of preparing 1-phenyl-2.3-dimethyl-4-diethyl ether amino-5-pyrazolone which comprises condensing 1-phenyl-2.3-dimethyl-4-amino-5-pyrazolone in aqueous solution with ββ′ dichlor diethyl ether in the presence of a water soluble weak alkaline reagent while adjusting the concentration of the solution so that it boils at 105 to 110° C.

2. The method of preparing 1-phenyl-2.3-dimethyl-4-diethyl ether amino-5-pyrazolone which comprises condensing 1-phenyl-2.3-dimethyl-4-amino-5-pyrazolone in aqueous solution with ββ′ dichlor diethyl ether in the presence of a water soluble, weak alkaline salt while adjusting the concentration of the solution so that it boils at 105 to 110° C.

3. The method of preparing 1-phenyl-2.3-dimethyl-4-diethyl ether amino-5-pyrazolone which comprises condensing 1-phenyl-2.3-dimethyl-4-amino-5-pyrazolone in aqueous solution with ββ′ dichlor diethyl ether in the presence of sodium carbonate while adjusting the concentration of the solution so that it boils at 105 to 110° C.

4. The method of preparing 1-phenyl-2.3-dimethyl-4-diethyl ether amino-5-pyrazolone which comprises heating 40.6 parts by weight of 1-phenyl-2.3-dimethyl-5-pyrazolone in 60 parts of water with 45 parts ββ' dichlor diethyl ether and 25 parts of sodium carbonate, on an oil bath at 105 to 110° C. for 8 hours while stirring.

5. 4-di-substituted amino derivatives of 1-phenyl-2.3-dimethyl-5-pyrazolone selected from the class consisting of

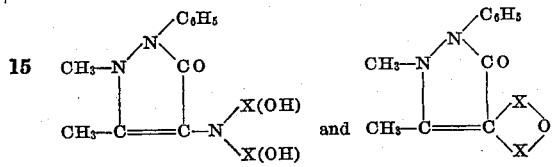

wherein X is selected from the group consisting of alkylene and phenylalkylene in which the beta carbon atoms are linked to the hydroxyl groups and oxygen atom respectively.

6. 4-di-substituted amino derivatives of 1-phenyl-2.3-dimethyl-5-pyrazolone derivatives having the general formula:

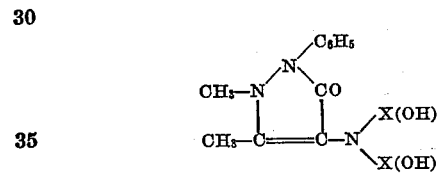

wherein X is selected from the group consisting of alkylene and phenylalkylene groups in which the beta carbon atoms are linked to the hydroxyl groups.

7. 1-phenyl-2.3-dimethyl-4-diethanol amino-5-pyrazolone having the formula:

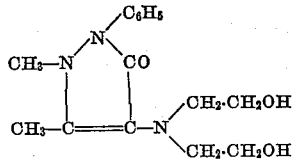

being a white crystalline compound melting at 85 to 87° C. and capable of forming a hydrochloride which melts at 162 to 164° C.

8. The 4-di-substituted ether amino derivatives of 1-phenyl-2.3-dimethyl-5-pyrazolone having the morpholin ring formula:

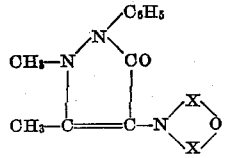

wherein X is selected from the group consisting of alkylene and phenylalkylene groups in which the beta carbon atoms are linked to the oxygen atom.

9. The 1-phenyl-2.3-dimethyl-4-diethyl ether amino-5-pyrazolone derivative, otherwise known as the morpholin derivative, having the formula:

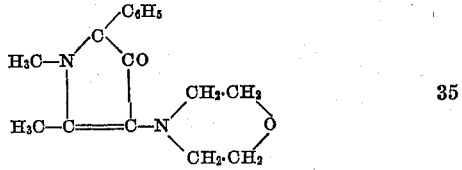

being a white crystalline compound melting at 157.5 to 158.5° C., and capable of forming a hydrochloride which melts at 187 to 189° C.

LOUIS FREEDMAN.